United States Patent
Björklund et al.

(10) Patent No.: US 8,300,435 B2
(45) Date of Patent: Oct. 30, 2012

(54) TRANSMISSION SYSTEM AND A METHOD FOR CONTROL THEREOF

(75) Inventors: Hans Björklund, Ludvika (SE); Rolf Lungqvist, Ludvika (SE)

(73) Assignee: ABB Technology Ltd., Zürich (CH)

( * ) Notice: Subject to any disclaimer, the term of this patent is extended or adjusted under 35 U.S.C. 154(b) by 853 days.

(21) Appl. No.: 12/161,402

(22) PCT Filed: Jun. 15, 2006

(86) PCT No.: PCT/SE2006/000718
§ 371 (c)(1),
(2), (4) Date: Mar. 27, 2009

(87) PCT Pub. No.: WO2007/084041
PCT Pub. Date: Jul. 26, 2007

(65) Prior Publication Data
US 2009/0219737 A1  Sep. 3, 2009

Related U.S. Application Data

(60) Provisional application No. 60/759,565, filed on Jan. 18, 2006.

(51) Int. Cl.
*H02J 3/36* (2006.01)
*H02M 5/45* (2006.01)
*H02M 7/10* (2006.01)

(52) U.S. Cl. ............ 363/35; 363/49; 363/51; 363/68; 363/71

(58) Field of Classification Search .......... 363/34, 363/35, 37, 49, 68, 71, 84, 51
See application file for complete search history.

(56) References Cited

U.S. PATENT DOCUMENTS
3,526,780 A * 9/1970 Danfors et al. ............ 307/82
(Continued)

FOREIGN PATENT DOCUMENTS
RU  2089986 C1  9/1997
(Continued)

OTHER PUBLICATIONS

International Search Report, dated Oct. 12, 2006, issued in connection with counterpart International Application No. PCT/SE2006/000718.

(Continued)

*Primary Examiner* — Adolf Berhane
*Assistant Examiner* — Fred E Finch, III
(74) *Attorney, Agent, or Firm* — Venable LLP; Eric J. Franklin

(57) ABSTRACT

An HVDC transmission system including a rectifier station and an inverter station each having a series connection of at least two converters. A by-pass DC breaker is connected in parallel with each converter. A control device is adapted to deblock a blocked converter by starting to control the converter at high delay angle and gradually decreasing the delay angle until substantially all DC current flows through the converter and to then control the by-pass breaker to open at substantially zero current, and to stop the operation of a converter by controlling the converter at gradually increasing delay angle until the voltage across the converter is substantially zero and to then control the converter to be blocked by firing a by-pass pair thereof and to then control the by-pass breaker to close for taking over all the DC current when the voltage between a neutral bus and a pole of a transmission line between the stations is to be increased and reduced, respectively.

15 Claims, 2 Drawing Sheets

U.S. PATENT DOCUMENTS

| | | | |
|---|---|---|---|
| 3,641,356 A * | 2/1972 | Ekstrom | 307/64 |
| 4,200,907 A * | 4/1980 | Hausler et al. | 363/35 |
| 4,263,517 A * | 4/1981 | Konishi | 307/82 |
| 4,429,357 A * | 1/1984 | Hausler et al. | 363/68 |
| 4,638,416 A * | 1/1987 | Neupauer et al. | 363/35 |
| 7,633,770 B2 * | 12/2009 | Datta et al. | 363/35 |

FOREIGN PATENT DOCUMENTS

| | | |
|---|---|---|
| RU | 2002111927 A | 11/2003 |
| SU | 764036 B | 9/1980 |
| WO | WO-90/16104 | 12/1990 |
| WO | WO 01/03268 A1 | 1/2001 |

OTHER PUBLICATIONS

Written Opinion of the International Searching Authority, dated Oct. 12, 2006, issued in connection with counterpart International Application No. PCT/SE2006/000718.

International preliminary report on patentability, Jul. 22, 2008, issued in connection with counterpart International Application No. PCT/SE2006/000718.

* cited by examiner

TRANSMISSION SYSTEM AND A METHOD FOR CONTROL THEREOF

CROSS-REFERENCE TO RELATED APPLICATIONS

This application claims priority to U.S. provisional patent application 60/759,565 filed 18 Jan. 2006 and is the national phase under 35 U.S.C. §371 of PCT/SE2006/000718 filed 15 Jun. 2006.

TECHNICAL FIELD OF THE INVENTION AND PRIOR ART

The present invention relates to a HVDC (High Voltage Direct Current) transmission system comprising at each end of an HVDC transmission line a converter station for connecting said transmission line to an AC system, each said station comprising a series connection of at least two converters having a DC side thereof connected on one hand to a pole of said transmission line on high potential and on the other to a neutral bus on zero potential by being earthed, a first of said converter stations being adapted to operate as rectifier and the other, second as inverter, each converter having a by-pass DC breaker connected in parallel therewith in a current path forming a by-pass of said converter when said breaker is closed, each converter station comprising an arrangement adapted to control the DC current through said pole and for each converter of the station a device for controlling that converter and the current therethrough for either increasing the voltage between said neutral bus and said pole and by that the power transmitted between said stations by starting operation of the converter when being blocked or reducing the voltage between said neutral bus and said pole and by that the power transmitted between said stations by stopping operation of the converter when being active, as well as a method for controlling such a transmission system.

The invention is not restricted to any particular levels of voltage between said neutral bus and said pole of the HVDC transmission line, but it is especially applicable to such voltages above 500 kV, which means that said transmission line transmits a substantial power and the transmission system requires a very high level of reliability. Neither is the invention restricted to any particular levels of currents through said poles of a said transmission line, but said lines are preferably rated for currents above 1 kA.

The converters include a number of current valves in any known configuration, for instance in a 12 pulse-bridge configuration. The converters may be line commutated Current Source Converters, in which the switching elements, such as thyristors, are turned off at zero crossing of the AC current in said AC system. The converters may also be forced commutated Voltage Source Converters, in which said switching elements are turn-off devices controlled according to a Pulse Width Modulation (PWM) pattern.

Two or more converters are normally connected in series when the voltage to be obtained between said neutral bus and said pole is too high for being possible to obtain through only one converter. It may cause large disturbances with very severe consequences on AC systems connected to a said HVDC transmission system if all the converters of a converter station and by that a converter station would fail and by that the power transmitted through the system falls to zero. This is the main reason for arranging said by-pass current path for each converter, so that an incorrectly operating converter may be by-passed and possibly disconnected for maintenance while the converter station may be operated by controlling the other converters of the station. It is then important to be able to stop such a converter in a way causing no disturbances in the transmission system. The same is applicable to a procedure for starting a converter of such a system for raising the voltage between the neutral bus and said pole and by that the power transmitted between said stations.

Such a starting procedure or stop procedure of converters for either increasing or reducing the voltage between said neutral bus and said pole has in transmission systems of the type defined in the introduction so far been carried out in a rather abrupt way resulting in a considerable risk of causing disturbances in the high power transmission system and by that also in AC systems connected thereto. This is particularly severe if the voltage and thereby the power is very high, such as in the case of a voltage above 600 kV, especially in the order of 800 kV or higher.

SUMMARY OF THE INVENTION

The object of the present invention is to provide a transmission system of the type defined in the introduction and a method for control thereof, which make it possible to control the start and stop of a converter that minimizes the disturbance on a power transmission of said transmission system.

This object is according to the invention obtained by providing such a transmission system in which each said control device is adapted to deblock a blocked said converter by starting to control it at high delay angle and gradually decreasing the delay angle until substantially all the DC current flows through that converter and to then control said by-pass breaker to open at substantially zero current, and to stop the operation of said converter by controlling it a gradually increasing delay angle until the voltage across the converter is substantially zero and to then control the converter to be blocked by firing a by-pass pair thereof and to then control said by-pass breaker to close for taking over all the DC current.

This way of using the control angle of said converters results in a smooth start and stop sequence of a said converter. By, controlling the converter in this way said DC by-pass breaker can be opened or closed in a reliable and safe way independent of the actual operation condition of the HVDC transmission system. "High delay angle" has different meaning depending upon the type of operation of the converter and an angle above 45° may sometimes be enough for being considered as high, while an angle above 140° may in another type of operation be required for being considered to be high.

According to an embodiment of the invention each station has two said converters connected in series between said neutral bus and said pole, which for instance in the case of 800 kV between said neutral bus and said pole when both converters are operated means 400 kV when only one of them is in operation and half the power transmitted when the DC current is kept constant.

According to another embodiment of the invention each said station has more than two said converters connected in series between said neutral bus and said pole, and said control devices of each station are adapted to increase or reduce the power transmitted between the stations by starting or stopping the operation of one converter of that converter station at a time. This results in a reliable and safe procedure to increase or reduce the power transmitted between the stations.

According to another embodiment of the invention said arrangement is adapted to control the DC current to be on a substantially constant, full current value under normal conditions of the system irrespectively of how many of the series connected converters in each station are in operation, said control devices of said converters are co-ordinated to increase the power transmitted by starting operation of a converter being inactive in said series connection of converters for by that raising the voltage between the neutral bus and the pole as follows:

a control device belonging to a converter, called starting converter, in said rectifier being inactive is adapted to deblock said converter by starting to control it at high delay angle and gradually decreasing the delay angle until substantially all the DC current flows through that converter and then to control the by-pass breaker in parallel therewith to open at substantially zero current, the control device belonging to an inactive converter of the inverter is adapted to then deblock said converter by starting to control it at high delay angle and gradually decreasing the delay angle until substantially all the DC-current flows through that converter and to then open the by-pass breaker in parallel therewith at substantially zero current, and said arrangement is adapted to then control said starting converter to increase the voltage between the neutral bus and the pole to a voltage corresponding to the increased number of converters in operation. Such a system enables a smooth and by that reliable and safe procedure to increase the power transmitted between the converter stations.

According to another embodiment of the invention said control devices of said converters are co-ordinated for reducing the power transmitted between the stations at a substantially constant direct current flow in said transmission line by reducing the voltage between said neutral bus and said pole as follows: a control device belonging to a converter in said inverter station is adapted to control that converter at a gradually increasing delay angle until the voltage across this converter is close to zero, to then block the converter by firing a by-pass pair thereof and to then close the by-pass breaker in parallel with that converter, the control devices of the converters of the rectifier station are adapted to then compensate for the voltage drop between said pole and neutral bus by increasing the delay angle at which these converters are controlled, a control device belonging to a converter of the rectifier station is adapted to then control said converter at a gradually increasing delay angle until the voltage across this converter is close to zero, to then control the converter to be blocked by firing a by-pass pair thereof and to then close said by-pass breaker for taking over all the DC current. Such a system enables a smooth and by that reliable and safe procedure to reduce the power transmitted between the stations of the system.

According to another embodiment of the invention each said converter comprises 12 converter valves arranged in a so-called 12-pulse configuration with three legs of four converter valves connected in series.

According to another embodiment of the invention said converters of the converter station operating as rectifier are adapted to generate, when all in operation, a direct voltage above 600 kV, such as 700-1000 kV between said neutral bus and said pole, and according to a further embodiment of the invention the transmission system is designed to be able to conduct a DC-current being above 500 A, above 1 kA or 2 kA-5 kA in said pole between the converter stations.

The invention also relates to a method for controlling a HVDC transmission system according to the appended independent method claim. The advantages and features of such a method and the embodiments thereof appear clearly from the above discussion of the different embodiments of the transmission system according to the invention.

The invention also relates to a computer program and a computer readable medium according to the corresponding appended claims. It is easy to understand that the method according to the invention is well suited to be carried out through program instructions from a processor which may be influenced by a computer program provided with the program steps in question.

Further advantages as well as advantageous features of the invention appear from the following description.

BRIEF DESCRIPTION OF THE DRAWING

With reference to the appended drawing below follows a specific description of embodiments of the invention cited as examples.

In the drawing.

DETAILED DESCRIPTION OF EMBODIMENTS OF THE INVENTION

Figure 1:
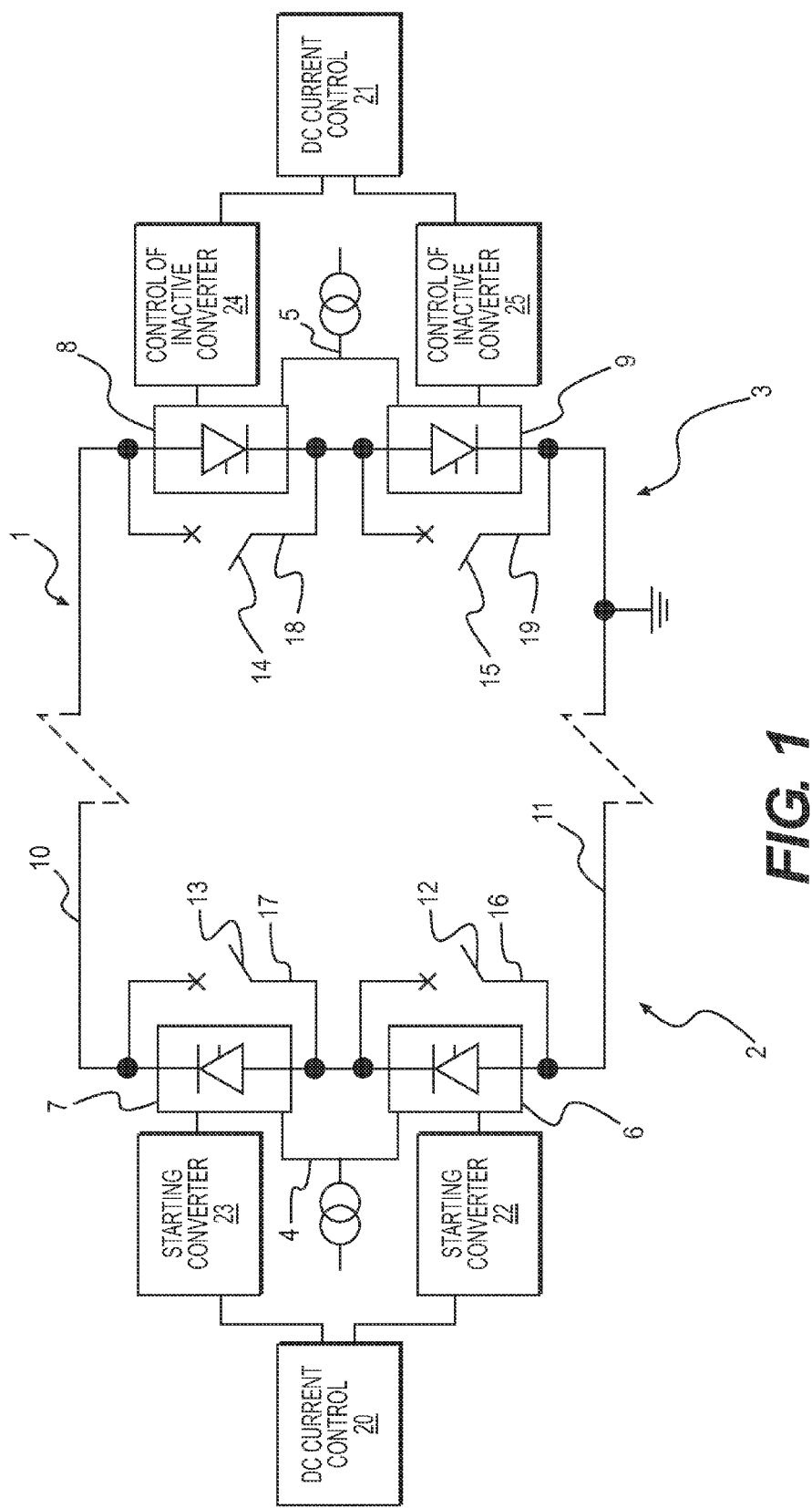
FIG. 1 is a schematic view illustrating the general structure of an HVDC transmission system according to a first embodiment of the invention.

An HVDC transmission system according to a first embodiment of the invention is shown in FIG. 1. This system has here at each end of a transmission line 1 a converter station 2, 3 for connecting said transmission line to an AC system 4, 5 schematically indicated. The AC system 4 is assumed to be a generating system in the form of any type of power plant with generators of electricity, whereas the AC system 5 is assumed to be a consuming system or network connecting to consumers of electric power, such as industries and communities. Thus, a first converter station 2 is adapted to operate as rectifier and the other, second converter station 3 as inverter. Each station comprises a series connection of two converters 6, 7 and 8, 9 having a DC side thereof connected on one hand to a pole 10 of positive polarity of said transmission line on high potential and on the other to a neutral bus 11 on zero potential by being earthed. Each converter includes a number of converter valves in any known configuration, for instance in a 12-pulse bridge configuration. These valves are formed by a plurality of power semiconductor devices connected in series for together holding a high voltage in the blocking state thereof.

Each converter has a by-pass DC breaker 12-15 connected in parallel therewith in a current path 16-19 forming a by-pass of said converter when said breaker is closed.

Each converter station further comprises an arrangement 20, 21 adapted to control the DC current through said pole 10 by controlling the converters of the station when these are in steady operation. Each station further comprises for each converter a separate control device 22-25 adapted to control the converter associated therewith for staring operation of that converter when it has been blocked until steady operation has been reached and for stopping operation of that converter when it has been active. How this is done is the key of the invention and will now be described.

The breakers 12-15 are open when the converter associated therewith is in operation. We now assume that one converter of each station, namely the converters 6 and 9 are in operation. This means that the rectifier station may only create half the voltage between the neutral bus 11 and the pole 10 in comparison to the case of having both converters of each station in operation. This means for instance in the present case a voltage of about 400 kV. The converters 7 and 8 are then blocked and the breakers 13 and 14 closed, so that the entire DC current flows through these breakers. The DC current in the pole 10 is by the control arrangement 20 controlled to be the same as if all converters would be in operation, so that the power then transmitted is half the power transmitted when all converters are in operation. The control arrangements 20 and 21 control the converters 6 and 9 in this operation mode. We now assume that the voltage between the neutral bus and the pole and by that the power transmitted between the stations 2, 3 shall be increased. The control device 23 for the converter 7 is then taking over the control of the converter 7 by deblocking it by starting to control it at high delay angle, such as in the order of 150°-160°, and gradually i.e. slowly, decreasing the delay angle until substantially all the DC current flows through that converter, in which the DC current is simultaneously controlled equal to the pole current. After confirming that the current in the by-pass breaker 13 is close to zero an opening order to this by-pass breaker is given. There will then be a ripple on the current which makes it possible to open the breaker 13. As soon as the current through the by-pass breaker 13 is identical to zero and the by-pass breaker has confirmed the open indication the control device 23 is set in hold position and the control of the converter 7 is slowly transferred to the control arrangement 20.

The next step for increasing the power transmitted from the rectifying station 2 to the inverter station 3 is carried out by control of the control device 24 for the inverter converter 8 to deblock this converter 8 by starting to control it at high delay angle, such as approximately 105°. The delay angle is then gradually slowly decreased down to about 90° while the DC current is controlled equal to the pole current until substantially all the DC current flows through the converter 8, whereupon an opening order is given to the by-pass breaker 14, which will be opened at substantially zero current. As soon as the by-pass breaker has confirmed the opened indication the delay angle for the control of the converter 8 is then ramped towards normal inverter operation, which means 18°-20°. The control device 24 is then set in hold position and the control action of the converter 8 is slowly transferred to the control arrangement 21. The control arrangement 20 of the rectifier station is now starting to control the converters 6 and 7 thereof for increasing the voltage between the neutral bus 11 and the pole 10 from for instance 400 kV to 800 kV and by that increasing the power transmitted between the stations correspondingly if the current is kept at the same level.

When for instance the converter 6 has to be disconnected for any reason, such as for maintenance thereof (a disconnector is arranged at both sides of each converter for enabling a disconnection thereof, although it has not been shown in the Figures) it is proceeded in the following way. The control device 24 belonging to a converter, let us say the converter 8, of the inverter station is then taking over the control of this converter from the control arrangement 21 and starts to control this converter at a gradually increasing delay angle until the voltage across this converter is close to zero, whereupon the converter 8 is blocked by firing a by-pass pair of current valves thereof. The by-pass breaker 14 is then controlled to close. The control devices 22, 23 of the converters 6, 7 in the rectifier station are then taking over the control of this converter from the control arrangement 20 by compensating for the voltage drop between said pole and the neutral bus caused by the control of the inverter converter 8 by increasing the delay angle at which these converters 6, 7 are controlled. This may take place up to a delay angle in the order of 60°. The control device 22 for the converter 6 is then starting to control said converter at a gradually increasing delay angle for further reducing the DC voltage across this converter until it is close to zero. The converter 6 is then controlled to be blocked by firing a by-pass pair thereof and the by-pass breaker 12 thereof is then closed for taking over all the DC current. The control arrangements 20 and 21 will then take over the control of the rectifier station and the inverter station converters, respectively. This means that the power transmitted from the rectifier station 2 to the inverter station 3 has then been reduced by approximately 50% by reducing the voltage between the neutral bus 11 and the pole 10 by approximately 50% while keeping the DC current substantially constant. Thus, this voltage will then be created by the operation of the converter 7, and the converter 9 will assist to maintain it.

These procedures of starting and stopping converters of the HVDC transmission system for increasing or reducing the power transmitted thereby is very smooth and by that reliable and safe minimizing disturbances of the HVDC power transmission.

Figure 2:
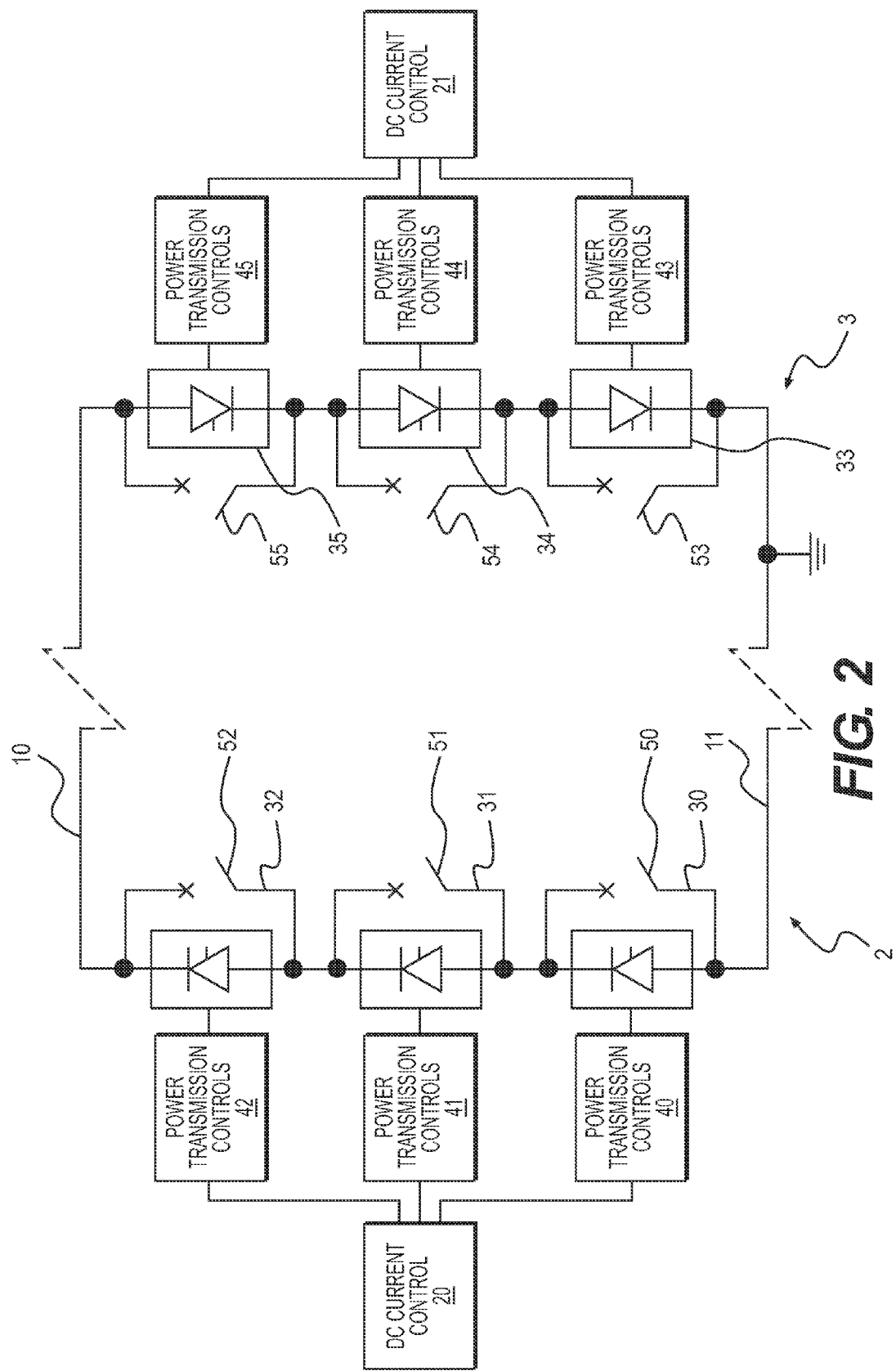
FIG. 2 is a view similar to FIG. 1 of an HVDC transmission system according to a second embodiment of the invention.

FIG. 2 illustrates a HVDC transmission system according to another embodiment of the invention differing from the one shown in FIG. 1 by having three converters 30-35 in each station instead of two. Each station has correspondingly three control devices 40-45 and DC breakers 50-55. Further parts being identical to those in the embodiment according to FIG. 1 are provided with the same reference numerals. This transmission system operates as described above with respect to FIG. 1 when the power transmitted from the rectifier station 2 to the inverter station 3 is to be increased or reduced by raising and lowering, respectively, the voltage between the neutral bus 11 and the pole 10. For making this procedure as smooth as possible the control devices of each station are adapted to increase or reduce the power transmitted between the stations by starting or stopping the operation of one converter of the respective converter station at a time. Thus, if for instance only the converters 30 and 33 would be in operation and the power transmitted between the stations shall be increased only one further converter of each station is first brought into operation and then the remaining converter of each station brought into operation when it is desired to increase the power transmitted further. The corresponding procedure is applicable for the case of reducing the power transmitted between the stations.

The invention is of course not in any way restricted to the embodiments described above, but many possibilities to modifications thereof will be apparent for a person with ordinary skill in the art without departing from the basic idea of the invention as defined in the appended claims.

The number of converters in each station may be another than shown in the Figures. Furthermore, the transmission system may be a bipolar transmission system having also a pole with negative polarity connected to the neutral bus through corresponding converters, and the design of all components for that pole may then be as for the other pole, for example as shown in the Figures.

The invention claimed is:

1. A high voltage direct current transmission system, comprising:
a converter station arranged at each end of a high voltage direct current transmission line, each converter station being configured to connect said transmission line to an AC system, each said station comprising a series connection of at least two converters having a DC side thereof connected to a pole of said transmission line on high potential and to a neutral bus on zero potential by being grounded, a first of said converter stations being adapted to operate as a rectifier and a second of said converter stations being adapted to operate as an inverter, each converter comprising a by-pass DC breaker connected in parallel in a current path forming a by-pass of said converter when said DC breaker is closed, each converter station comprising an arrangement adapted to control DC current flowing through said pole and comprising for each converter of each station a device for controlling that converter and the current therethrough for either increasing the voltage between said neutral bus and said pole and thereby power transmitted between said stations by starting operation of the converter when being blocked or reducing the voltage between said neutral bus and said pole and thereby the power transmitted between said stations by stopping operation of the converter when being active, wherein each said control device is adapted to unblock a blocked said converter by starting to control the converter at a high delay angle and gradually decreasing the delay angle until substantially all the DC current flows through that converter and to then control said by-pass breaker to open at substantially zero current, and to stop the operation of said converter by controlling the controller at a gradually increasing delay angle until the voltage across the converter is substantially zero and to then control the converter to be blocked by firing a by-pass pair thereof and to then control said by-pass breaker to close for taking over all the DC current.

2. The transmission system according to claim 1, wherein each said station comprises two said converters connected in series between said neutral bus and said pole.

3. The transmission system according to claim 1, wherein each said station comprises more than two said converters connected in series between said neutral bus and said pole, and wherein said control devices of each station are adapted to increase or reduce the power transmitted between the stations by starting or stopping the operation of one converter of that converter station at a time.

4. The transmission system according to claim 1, wherein said arrangement is adapted to control the DC current to be on a substantially constant, full current value under normal conditions of the system irrespectively of how many of the series connected converters in each station are in operation, wherein said control devices of said converters are coordinated to increase the power transmitted by starting operation of a converter being inactive in said series connection of converters for raising the voltage between the neutral bus and the pole as follows:

a control device belonging to a converter, called starting converter, in said rectifier being inactive is adapted to unblock said converter by starting to control the converter at high delay angle and gradually decreasing the delay angle until substantially all the DC current flows through that converter and then to control the by-pass breaker in parallel therewith to open at substantially zero current, the control device belonging to an inactive converter of the inverter is adapted to then unblock said converter by starting to control the blocked converter at high delay angle and gradually decreasing the delay angle until substantially all the DC-current flows through that converter and to then open the by-pass breaker in parallel therewith at substantially zero current, and wherein said arrangement is adapted to then control said starting converter to increase the voltage between the neutral bus and the pole to a voltage corresponding to the increased number of converters in operation.

5. The transmission system according to claim 1, wherein said control devices of said converters are coordinated for reducing the power transmitted between the stations at a substantially constant direct current flowing in said transmission line by reducing the voltage between said neutral bus and said pole as follows:

a control device belonging to a converter in said inverter station is adapted to control that converter at a gradually increasing delay angle until the voltage across this converter is close to zero, to then block the converter by firing a by-pass pair thereof and to then close the by-pass breaker in parallel with that converter, the control devices of the converters of the rectifier station are adapted to then compensate for the voltage drop between said pole and neutral bus by increasing the delay angle at which these converters are controlled, a control device belonging to a converter of the rectifier station is adapted to then control said converter at a gradually increasing delay angle until the voltage across this converter is close to zero, to then control the converter to be blocked by firing a by-pass pair thereof and to then close said by-pass breaker for taking over all the DC current.

6. The transmission system according to claim 1, wherein said converters of the converter station operating as rectifier are adapted to generate, when all in operation, a direct voltage above 600 kV between said neutral bus and pole.

7. The transmission system according to claim 1, wherein the transmission system is designed to be able to conduct a DC current being above 500 A in said pole between the converter stations.

8. A method for controlling a high voltage direct current transmission system, said system comprising at each end of a high voltage direct current transmission line a converter station for connecting said transmission line to an AC system, each converter station comprising a series connection of at least two converters having a DC side thereof connected on one hand to a pole of said transmission line on high potential and on the other to a neutral bus on zero potential by being grounded, a first of said converter stations being adapted to operate as rectifier and a second of said converter stations being adapted to operate as inverter, each converter comprising a by-pass DC breaker connected in parallel therewith in a current path forming a by-pass of said converter when said breaker is closed, said method comprising:

controlling a DC current through said pole to be on a substantially constant, full current value under normal conditions of said transmission system, increasing a voltage between said neutral bus and said pole and thereby a power transmitted between said stations by starting operation of the converters being blocked, or reducing the voltage between said neutral bus and said pole and thereby the power transmitted between said converter stations by stopping operation of converters being active, wherein increasing the voltage between the neutral bus and the pole comprises unblocking a blocked converter by starting to control the blocked converter at a high delay angle and gradually decreasing the delay angle until substantially all the DC current flows through that converter and to then control said by-pass breaker in parallel with that converter to open at substantially zero current, and wherein reducing the voltage between the neutral bus and the pole the operation of said converter is stopped by controlling the converter at a gradually increasing delay angle until the voltage across the converter is substantially zero and then controlling the converter to be blocked by firing a by-pass pair thereof and then controlling said by-pass breaker in parallel with that converter to close for taking over all the DC current.

9. The method according to claim 8, wherein the method is carried out for a said transmission system in which each said station has two said converters connected in series between said neutral bus and said pole.

10. The method according to claim 8, wherein the method is carried out on a said transmission system having in each said converter station more than two said converters connected in series between said neutral bus and said pole, and wherein the power transmitted between the stations is increased or reduced by starting or stopping the operation of one converter of each converter station at a time.

11. The method according to claim 8, wherein increasing the voltage between the neutral bus and the pole comprises increasing the power transmitted between said converter stations by unblocking a converter, here called starting converter, in said rectifier being inactive by starting to control the starting converter at high delay angle and gradually decreasing the delay angle until substantially all the DC current flows through the starting converter, wherein the by-pass breaker in parallel with the starting converter is then opened at substantially zero current, wherein an inactive converter of the inverter is then unblocked by starting to control the blocked converter at high delay angle and gradually decreasing the delay angle until substantially all the DC current flows through the starting converter, wherein the by-pass breaker in parallel with the starting converter is then opened at substantially zero current, and wherein said starting converter is then controlled to increase the voltage between the neutral bus and the pole to a voltage corresponding to the increased number of converters in operation.

12. The method according to claim 8, wherein reducing the voltage between the neutral bus and the pole the power transmitted between the stations is reduced in that a converter in said inverter station is controlled at a gradually increasing delay angle until the voltage across this converter is close to zero, wherein this converter is then blocked by firing a by-pass pair thereof, that the by-pass breaker in parallel with that converter is then closed, wherein the converters of the rectifier station are then controlled to compensate for the voltage drop between said pole and the neutral bus by increasing the delay angle at which these converters are controlled, wherein a converter of the rectifier station is then controlled at a gradually increasing delay angle until the voltage across this converter is close to zero, wherein this converter is then blocked by firing a by-pass pair thereof, and wherein the by-pass breaker in parallel with the converter last mentioned is closed for taking over all the DC current.

13. A computer program product, comprising
a non-transitory computer readable medium; and
computer program instructions recorded on the computer readable medium and executable by a processor for carrying out a method for controlling a high voltage direct current transmission system, said system comprising at each end of a high voltage direct current transmission line a converter station for connecting said transmission line to an AC system, each converter station comprising a series connection of at least two converters having a DC side thereof connected on one hand to a pole of said transmission line on high potential and on the other to a neutral bus on zero potential by being grounded, a first of said converter stations being adapted to operate as rectifier and a second of said converter stations being adapted to operate as inverter, each converter comprising a by-pass DC breaker connected in parallel therewith in a current path forming a by-pass of said converter when said breaker is closed, said method comprising:
controlling a DC current through said pole to be on a substantially constant, full current value under normal conditions of said transmission system,
increasing a voltage between said neutral bus and said pole and thereby a power transmitted between said stations by starting operation of the converters being blocked, or
reducing the voltage between said neutral bus and said pole and thereby the power transmitted between said converter stations by stopping operation of converters being active,
wherein increasing the voltage between the neutral bus and the pole comprises unblocking a blocked converter by starting to control the blocked converter at a high delay angle and gradually decreasing the delay angle until substantially all the DC current flows through that converter and to then control said by-pass breaker in parallel with that converter to open at substantially zero current, and
wherein reducing the voltage between the neutral bus and the pole the operation of said converter is stopped by controlling the converter at a gradually increasing delay angle until the voltage across the converter is substantially zero and then controlling the converter to be blocked by firing a by-pass pair thereof and then controlling said by-pass breaker in parallel with that converter to close for taking over all the DC current.

14. The computer program product according to claim 13, wherein the computer program instructions further comprise providing the computer program instructions at least partially through a network.

15. The computer program product according to claim 14, wherein the network is the internet.

* * * * *

UNITED STATES PATENT AND TRADEMARK OFFICE
CERTIFICATE OF CORRECTION

| | | |
|---|---|---|
| PATENT NO. | : 8,300,435 B2 | Page 1 of 1 |
| APPLICATION NO. | : 12/161402 | |
| DATED | : October 30, 2012 | |
| INVENTOR(S) | : Hans Björklund et al. | |

It is certified that error appears in the above-identified patent and that said Letters Patent is hereby corrected as shown below:

On the title page item (75), line 2, "Lungqvist" should be --Ljungqvist--.

Signed and Sealed this
First Day of April, 2014

Michelle K. Lee
*Deputy Director of the United States Patent and Trademark Office*